United States Patent
Noura

[15] 3,702,914
[45] Nov. 14, 1972

[54] METHOD AND APPARATUS FOR BUTT WELDING PLATES

[72] Inventor: Hirokazu Noura, Yokohama, Japan

[73] Assignee: Nippon Kokan Kabushiki Kaisha, Tokyo, Japan

[22] Filed: March 20, 1970

[21] Appl. No.: 21,393

[52] U.S. Cl. ............................. 219/73, 219/125 R
[51] Int. Cl. ........................... B23k 9/18, B23k 9/12
[58] Field of Search ......................... 219/124, 125, 73

[56] References Cited

UNITED STATES PATENTS

| | | | |
|---|---|---|---|
| 3,444,352 | 5/1969 | Odgen et al. | 219/125 R |
| 2,683,432 | 7/1954 | Schanz | 219/125 R |
| 2,191,476 | 2/1940 | Hopkins | 219/125 R |
| 3,019,328 | 1/1962 | Brashear, Jr. et al. | 219/73 |

Primary Examiner—J. V. Truhe
Assistant Examiner—Hugh D. Jaeger
Attorney—Steinberg & Blake

[57] ABSTRACT

A method and apparatus for butt welding plates one to the next. The plates are arranged with the opposed end edges of one plate situated next to adjoining edges of a pair of adjoining plates, and the latter adjoining edges are simultaneously welded to the end edges of the one plate. The plates are arranged in a row with their end edges extending transversely of the row, and a pair of welding means are provided for simultaneously welding the opposed end edges of one plate to the adjoining end edges of the adjoining plates. The pair of welding means are carried by a carriage which is movable transversely of the row of plates, in the direction of the end edges thereof. This carriage is supported for movement on a transverse beam of a bridge crane which is capable of moving longitudinally of the row, and an adjusting structure coacts with the pair of welding means to adjust the distance therebetween so that this latter distance will precisely equal the distance between the opposed end edges of the plate which is simultaneously welded to the adjoining end edges of adjoining plates.

3 Claims, 3 Drawing Figures

PATENTED NOV 14 1972 3,702,914

PATENTED NOV 14 1972

3,702,914

INVENTOR

BY *HIROKAZU NOMURA*

Steinberg and Blake
ATTORNEYS 3,702,914

METHOD AND APPARATUS FOR BUTT WELDING PLATES

BACKGROUND OF THE INVENTION

The present invention relates to welding.

In particular, the present invention relates to butt welding, and especially to the butt welding of plates.

As is well known, it is possible to build up various types of wall structures from metal plates which are butt welded one to the next. For example, in the shipbuilding industry, steel plate used for various parts of a ship can be butt welded one to the next so as to form strong wall structures useful for many different purposes. Structures of this latter type are built by welding one plate to another plate along adjoining edges of the plates in a shop where the several plates to be welded are first properly positioned one with respect to the other and then each welded joint is formed by butt welding a pair of adjoining edges to each other. These operations involve welding of the adjoining edges of the plates to each other one by one, so that at any given moment only one pair of adjoining edges are undergoing butt welding operations.

The result is that these operations are time consuming, requiring long periods of time during which equipment is tied up to carry out the tedious operations of this type, and of course the labor costs also are exceedingly high.

SUMMARY OF THE INVENTION

It is accordingly a primary object of the present invention to provide an improvement of the above conditions.

In particular, it is an object of the invention to provide a method and apparatus which make it possible to carry out welding operations of the above type at a rate which is far more rapid than has heretofore been the case, so that in this way it becomes possible to cut down the time required to weld a series of plates to each other.

In addition, it is an object of the invention to provide a method and apparatus which will not only decrease the time and labor required for welding plates to each other, but which in addition will not in any way detract from the quality of the welded structure.

Furthermore, it is an object of the invention to provide an apparatus capable of butt welding plates to each other along more than one pair of adjoining edges simultaneously while at the same time being adjustable so that the apparatus can be accommodated to different distances between pairs of adjoining edges which are to be butt welded to each other.

According to the invention the apparatus includes a pair of welding means for simultaneously welding the opposed end edges of one plate to adjoining end edges of a pair of additional plates between which the one plate is located. A carriage means carries the pair of welding means to guide them for movement along the pair of opposed end edges of this one plate so as to simultaneously weld these edges to the adjoining edges of the adjoining plates. A bridge crane has a transverse beam on which the carriage means is mounted for movement in the direction of the edges which are welded, these edges extending transversely of a row of the plates, and the bridge crane is itself movable longitudinally of this row. In addition, an adjusting means coacts with the pair of welding means to adjust the distance therebetween according to the distance between the pair of opposed end edges of a given plate which is simultaneously welded to adjoining plates, so that the apparatus can accommodate itself to the particular dimensions of plates which are to be welded. Thus, with the method of the invention simultaneously welding of opposed end edges of one plate to adjoining edges of a pair of adjoining plates is carried out with the butt welding operations progressing simultaneously from the extremities of one pair of adjoining end edges of this series of plates to the opposed end of these edges.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
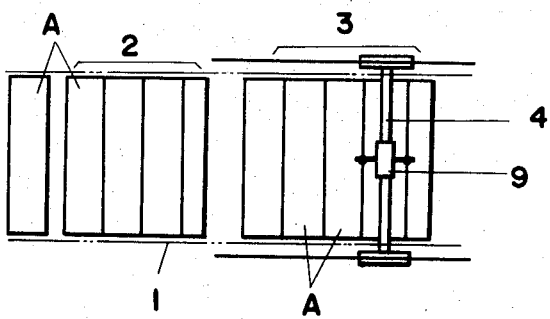
FIG. 1 is a schematic top plan view illustrating the method and apparatus of the invention.

Referring to FIG. 1, it will be seen that the work is comprised of a series of plates A which are to be welded one to the next with the butt welding apparatus and method of the invention. The several plates A are arranged in a row along a suitable conveyor line 1 so that the plates can conveniently be moved from the preparatory region 2, where a series of plates A are tack welded one to the next to the welding station 3 where the butt welding operations take place. Thus, the several plates A which are to be welded are initially located at the station 2 where a series of the plates are first tack welded one to the next along their adjoining end edges, which are the longer edges of the rectangular plates shown in FIG. 1. Then the thus tack-welded plates which are temporarily connected to each other at the station 2 are conveyed to the right, as viewed in FIG. 1, to the welding station 3. The plates are all situated in a common horizontal plane, and it is to be noted from FIG. 1 that the plates are not at all of a uniform width between their adjoining end edges which extend transversely of the row of plates, or in other words of the conveyor line 1.

Figure 2:
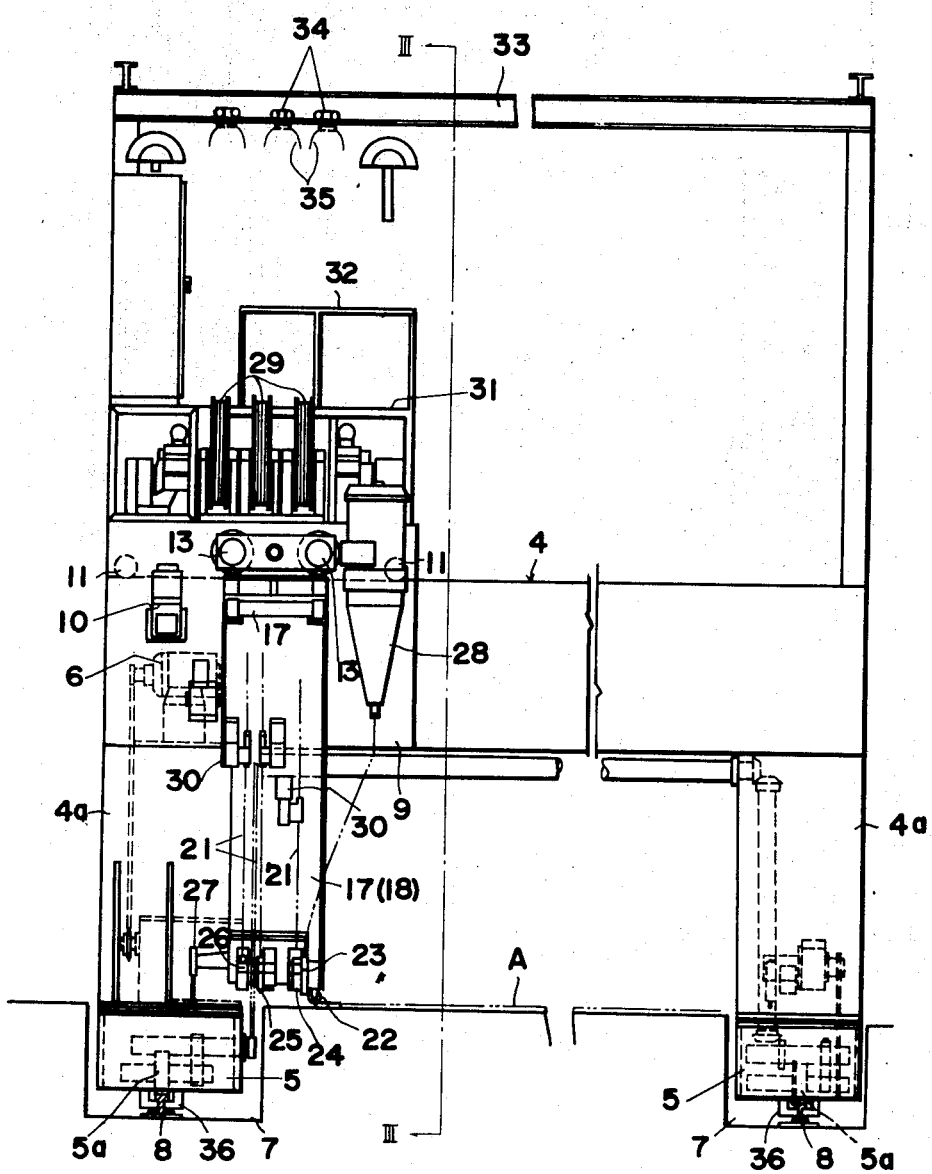
FIG. 2 is a transverse elevation taken in a plane transverse to the row of plates which are to be welded and showing schematically the various components of the structure of the invention for carrying out the method of the invention.
Figure 3:
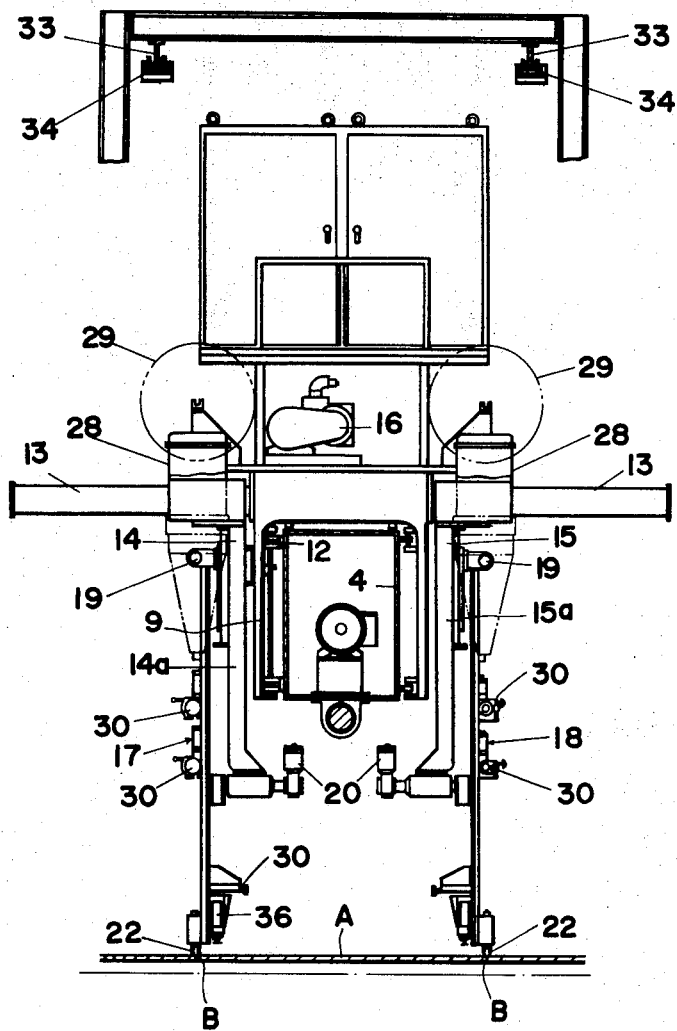
FIG. 3 is a fragmentary longitudinal sectional elevation taken line III—III of FIG. 2 in the direction of the arrows and showing in a plane which extends parallel to the row of plates which are welded further details of the apparatus and method of the invention.

At the butt welding station 3 the plates are automatically butt welded to each other with the apparatus and method of the invention the details of which are apparent from FIGS. 2 and 3. As may be seen from FIG. 2 in particular, the apparatus includes a crane means in the form of a bridge crane having a transverse beam 4 extending transversely across and over the row of plates. The ends of the transverse beam 4 of the bridge crane are carried by opposed uprights 4a, 4a, each of which is formed of an assembly of beams forming a vertical frame at each side of the bridge crane.

As may be seen from FIG. 2, the floor of the shop is formed with a pair of parallel trenches 7 for accommodating the lower ends of the uprights 4a, and the bases of these trenches 7 are respectively provided with tracks 8. The bottom ends of the uprights 4a respectively carry wheel bases 5 which support for rotary movement wheels 5a which are respectively capable of rolling along the tracks 8. In this way the crane means is capable of moving in the direction of the row of plates A. The uprights 4a may take the form of hollow vertical extending enclosures, particularly beneath the transverse beam 4 and within one of these enclosures there is an electric motor 6 which through a suitable gear transmission is operatively connected with the wheels 5a so that the wheels can be turned to bring about traveling of the crane along the tracks 8. When the crane means has arrived at a desired location it can be locked in position through known units 36 which are capable of being actuated to clamp the rails and thus fix the crane means at a selected location along the tracks 8.

A carriage means 9 is carried by the transverse beam 4 of the crane means for movement along this transverse beam transversely of the row of plates A, but parallel to the opposed end edges thereof which are to be welded together. This carriage means 9 is generally of a saddle-shaped configuration as is apparent from FIG. 3, and extends around and is supported on the transverse beam 4 in the manner shown most clearly in FIG. 3. Thus, the carriage means 9 is movable transversely of the row of plates A in a direction perpendicular to the direction in which they are conveyed from the preliminary station 2 where the tack welding is carried out to the work station 3 where the final butt welding is carried out. A drive mechanism 10 is carried by the carriage means 9 at one side thereof, as indicated at the left central region of FIG. 2, and this drive 10 operates through pinions on racks 12 mounted on one side of the beam 4, the left side thereof as viewed in FIG. 3, so that through this mechanism the carriage 9 can be driven along the beam 4. In addition, the carriage 9 carries rollers 11, indicated in dotted lines in FIG. 2, by means of which the carriage 9 rests on the top wall of the hollow transverse beam 4 so as to ride along the latter with rolling of the rollers 11 on the beam 4.

The motor 6 is indicated at the left upright 4a in FIG. 2 and the gear transmission driven thereby is indicated in part in FIG. 3, FIG. 3 also showing beneath the beam 4 in section one of the transmission shafts supported for rotary movement in a suitable bearing and connected through beveled gearing and additional transmission components to the wheel 5a situated at the lower end of the right upright 4a of FIG. 2.

The saddle-shaped frame of the carriage means 9, which extends around the beam 4, supports for rotary movement forwardly and rearwardly extending screws 13, these screws having parallel horizontal axes which extend parallel to the row of plates A perpendicularly with respect to the end edges of the plates which are to be welded. In the illustrated example there are a pair of rotary screws 13 at each side of the carriage means 9, and these screws 13 extend through mating threaded bores formed at the upper end of carrier units 14 and 15. The motor 16 is operatively connected through a suitable transmission with the rotary screws 13 to turn the latter for providing between the carriage means 9 and the carriers 14 and 15 an adjusting means for adjusting the distance between the carriers 14 and 15 in the direction of the row of plates A. Thus, through suitable reduction gearing the motor 16 will be capable of transmitting a rotary drive to the screws 13 for determining the distance between the carriers 14 and 15. These carriers 14 and 15 respectively directly carry a pair of welding means 17 and 18 in the form of welding heads having welding components for carrying out the welding operations in a manner described in greater detail below. Therefore, by adjusting the carriers 14 and 15 it is possible to adjust the distance between the pair of welding means 17 which are situated substantially one behind the other along the row of plates A, and 18 and in this way it is possible to precisely locate the pair of welding means at a distance from each other corresponding to the distance between the opposed end edges of a plate A which is to be welded at these end edges to the adjoining end edges of a pair of adjoining plates A. These edges are located along the weld lines B indicated in FIG. 3.

The pair of carriers 14 and 15 respectively have downwardly extending arms 14a and 15a respectively carrying pivots 19 from which the welding heads 17 and 18 are suitably suspended. The lower parts of the pair of welding means 17 and 18 extend all the way up to the plates A where the welding takes place. As is indicated in FIG. 2 in particular, the lower parts of the pair of welding means 17 and 18 are respectively provided with servo-motors 20 situated at the lower ends of the arms 14a and 15a of the carriers 14 and 15. These servo-motors are driven so as to locate the welding electrodes 24, 25, and 26 at the lower end of each arm 14a and 15a, precisely at the weld lines B, in a fully automatic manner. Thus, the motors 20 can be actuated to determine the locations of the welding electrodes 24–26. Furthermore, the pair of welding means respectively include a pair of stylus rollers 22, 22, which are positioned so as to extend into the V-grooves formed by the beveled end edges where the butt welding takes place. These stylus rollers 22 will lead in the direction of welding, and the pair of welding means 17 and 18 include in order behind the leading stylus rollers at each welding means a flux-spraying opening 23 through which flux is delivered to the area where the welding operation take place, the first electrode 24, the second electrode 25, the third electrode 26, and a flux-withdrawing opening 27 through which flux is sucked away from the welding location. During operation of the pair of weld means these stylus rollers 22, 22 are inserted into the V-grooves formed by the beveled edges along the weld lines B,B, and wire welding rods 21 are provided to form the fillers which are melted to form the welding material at the butt joints. Thus, the rods 21 are acted upon in a well known manner by the three welding electrodes 24, 25 and 26, and simultaneously flux is sprayed through the opening 23 to the welding region, so that the welding operations can be properly carried out as the pair of welding means 17, 18 simultaneously progress from one end of a pair of weld lines B to the opposed end thereof, this movement being carried out by driving of the carriage means 9 along the beam 4 transversely of the roller plates A. The servo-motors 20 are operated so as to properly position the electrodes 24–26 at the weld lines B,B, suitable electrical signals being provided in an electrical circuit or network into which all of the components are located so as to bring about the required operations. This electrical structure is capable of sensing any slight fluctuations in the stylus rollers 22 which are situated in the V-grooves, so as to provide a signal converted by a differential transformer for bringing about proper adjustment of the components in a fully automatic manner. These electrical signals are delivered to a pair of vertical adjusting components 37v and horizontal adjusting components 37h, in the form of electrical servomotors or the like, so that through these components 37v and 37h it is possible to precisely position the stylus rollers and electrodes.

The flux-spraying opening 23 and the flux-retrieval opening 27 are respectively placed in communication with the exit and entrance locations of a separation tank 28 carried at the side of each of the carriers 14 and 15. Thus, suitable pipes or tubes provide the required communication between the flux-spraying opening 23 and the flux-retrieving opening 27 and the separation tank 28 in which the retrieved flux is treated before being recirculated. Thus, the flux, after being sprayed from the opening 23 to the welding location will of course enter into the operations with any excess flux being retrieved through the opening 27 and delivered back to the tank 28 for separation and then circulation back to the flux-spraying opening 23.

The several wires which form the welding rods 21 are respectively coiled on three reels 29, shown most clearly in FIG.2. Thus, there are three reels 29 for each welding means, and the arrangement of the two sets of reels 29 over the carriers 14 and 15 to be supported thereon is schematically indicated in FIG.3. A feed mechanism 30 at each welding means engages the welding rod 21 to feed it to the welding location. Over the carriage 9 the apparatus may include a stand 31 where the operator can stand or sit so as to oversee the operations, and a handrail 32 may be provided on the carriage means 9 for the convenience of the operator at the stand 31.

Furthermore, the transverse beam 4 of the bridge crane supports a framework schematically indicated at the upper portions of FIGS. 2 and 3 and including rails 33 for guiding cable-carrying trolleys 34. These trolleys 34 are movable along the rails 33 and carry the electrical cables 35 through which the power is supplied to the welding apparatus. It will be noted that the rails 33 extend in the direction of the beam 4 transversely of the row of plates A so that the trolleys which carry the power cables can follow the carriage 9 as it progresses along the end edges during the welding thereof. Thus, the electric current will flow from the power source to the welding head 17, 18 through the cables 35 suspended from the trolleys 34.

During operation of the above apparatus of the invention to practice the method of the invention, after the initially tack-welded plates are situated at the welding station 3, the pair of welding means 17 and 18 are adjusted one with respect to the other through rotary movement of the adjusting screws 13 so that the distance between the stylus rollers 22 will correspond to the distance between the pair of opposed end edges of one plate A whose latter end edges extend along the weld lines B,B and are to be simultaneously welded to the adjoining end edges of the adjoining plates A. Thus, after this distance between the pair of welding means 17,18 is adjusted the entire bridge crane means can be moved along the rails 8 so as to properly position the stylus rollers at the location of the pair of V-grooves formed by the adjoining beveled edges along which the stylus rollers travel in advance of the weldment which is deposited into the V-grooves. It is possible to provide a two-speed drive through the motor 6 so as to quickly transport the entire crane means to the immediate vicinity where the welding operations are to take place and then to move the crane means at a much slower speed so as to very precisely position the welding means at the required locations.

The stylus rollers 22 are inserted into the V-grooves extending along the weld lines B, and of course , the first, second, and third electrodes 24 – 26 are properly positioned. During the welding operations the saddle-shaped carriage means 9 moves in the direction of the weld lines B so as to automatically bring about the butt welding operations to simultaneously weld three plates to each other during a single pass. After a single pass has been completed, the apparatus can automatically sense that the opposite end of the lines B have been reached so as to automatically terminate the feeding of the welding rod and the spraying of the flux. At this point the several electrodes 24 – 26 are automatically raised together with the stylus rollers and the carriage means 9 is then automatically returned back to the starting end of the beam 4 so that the above operations can then be repeated at another pair of weld lines.

It is thus apparent that with the above-described automatically operated apparatus of the invention and with the above-described method of the invention the output and efficiency of the operations are greatly enhanced because it becomes possible to carry out a pair of welding operations simultaneously in a single pass. The fact that the bridge crane means can travel quickly longitudinally along the series of plates which are to be welded greatly reduces the time required for the total operations, and of course the provision of the carriage means 9 to travel transversely of the row of plates also greatly enhances the improvements which are achieved with the invention. The adjusting means 13 for adjusting the distance between the pair of welding means 17 and 18 is also of great significance since it enables the pair of welding means to be accommodated to plates of different dimensions between the opposed end edges which are to be welded. Thus the butt welding apparatus and the method of the invention can be used very effectively in a wide variety of applications irrespective of the particular width of the plates or other bodies which are to be welded inasmuch as the distance between the pair of welding means can be readily adjusted.

What is claimed is:

1. In an apparatus for butt welding a series of plates which are arranged in a row with end edges of the plates extending transversely of the row, at least a pair of welding means situated substantially one behind the other along the row of plates for butt welding the opposed end edges of one plate simultaneously to the adjoining edges of a pair of plates between which said one plate is located, carriage means carrying said pair of welding means for moving the pair of welding means simultaneously along the opposed end edges of said one plate during welding of the latter to the adjoining end edges of the pair of plates between which said one plate is located, and crane means carrying said carriage means for positioning the latter along said row of plates and for holding said carriage means at a predetermined position along said row with the pair of welding means aligned with the end edges of said one plate for movement simultaneously therealong, said crane means extending across the row and guiding said carriage means, during welding while said crane means remains stationary, for movement along the end edges of said one plate transversely of the row of plates and said crane means being movable in its entirety along said row of plates together with said carriage means and pair of welding means to situate said pair of welding means in alignment with the end edges of a selected plate which is to be welded to a pair of adjoining plates between which the selected plate is located, so that after one plate is welded at its end edges to a pair of adjoining plates said crane means may be relocated with respect to the row of plates for then carrying out additional welding operations at a pair of opposed end edges of another plate, said crane means having a transverse beam extending across said row of plates and said carriage means extending around and straddling said transverse beam of said crane means, and a pair of adjusting means extending forwardly and rearwardly of said carriage means outwardly away from the latter so that said carriage means is situated between said pair of adjusting means and said transverse beam of said crane means, with said pair of adjusting means extending longitudinally of the row of plates, said pair of adjusting means being operatively connected between said carriage means and said pair of welding means for adjusting the distance between the latter in the direction of the row of plates for precisely situating the pair of welding means from each other at a distance corresponding to the distance between the pair of opposed end edges of the particular plate which is to be welded simultaneously at its end edges to the adjoining edges of the pair of adjoining plates.

2. The combination of claim 1 and wherein said crane means straddles the row of plates and has a pair of opposed uprights between which the row of plates extends and said transverse beam extending between and carried by said uprights with said transverse beam extending transversely over the row of plates.

3. The combination of claim 1 and wherein said adjusting means includes rotary screws carried by said carriage means and extending in the direction of the row of plates, drive means connected to the screws for rotating the latter, and a pair of carriers respectively carrying the pair of welding means and threaded on the screws to be moved with the pair of welding means toward and away from each other in accordance with the rotation of the screws of the adjusting means.

* * * * *